United States Patent

[11] 3,617,752

[72] Inventors Charles E. Page
Westbury;
Gustavo A. Andersen, Hollis, both of N.Y.
[21] Appl. No. 874,548
[22] Filed Nov. 6, 1969
[45] Patented Nov. 2, 1971
[73] Assignee Hazeltine Corporation

[54] LIGHT COLLECTION AND DETECTION APPARATUS COMPRISING PLURAL LIGHT SENSORS SO SPACED THAT THE COMPOSITE RESPONSE IS INDEPENDENT OF SOURCE POSITION
20 Claims, 7 Drawing Figs.

[52] U.S. Cl. .................................................. 250/209,
250/220
[51] Int. Cl. ....................................... H01j 39/12
[50] Field of Search............................................. 250/220,
220 MX, 209

[56] References Cited
UNITED STATES PATENTS
2,984,750 5/1961 Herriott...................... 250/220 MX

*Primary Examiner*—James W. Lawrence
*Assistant Examiner*—T. N. Grigsby
*Attorney*—Kenneth P. Robinson ABSTRACT: Disclosed is light collection and detection apparatus which exhibits a substantially uniform response characteristic with respect to a diffuse spot of light which may emanate from any point on a planar source such as exists where a flying spot scanner scans a photographic transparency that is positioned on a translucent, opal glass plate. Located below the glass plate and separated therefrom by a chosen distance is a plurality of photomultipliers, each having a known polar light response characteristic which is nonuniform with respect to at least some of the possible points from which the diffuse spot of light may emanate on the opal surface of the glass plate. Each of the photomultipliers develops an output signal representative of the intensity of the diffuse spot, and the plurality of photomultipliers are arranged in a predetermined array in a plane substantially parallel to that of the glass plate so as to effect an overlapping of the light response characteristics of the individual photomultipliers by a selected amount in the plane of the opal glass plate. The output signals from the individual photomultipliers are additively combined to develop a resultant output signal whose amplitude is substantially linearly proportional to the intensity of the diffuse spot of light regardless of the location of the point on the opal glass plate from which the spot of light emanates. Other embodiments are disclosed.

LIGHT COLLECTION AND DETECTION APPARATUS COMPRISING PLURAL LIGHT SENSORS SO SPACED THAT THE COMPOSITE RESPONSE IS INDEPENDENT OF SOURCE POSITION

The present invention relates to light collection and detection apparatus, and more particularly to such apparatus which is capable of responding uniformly to a spot of light which may emanate from any point on a planar source.

There exist in the art systems, such as those used to analyze photographic transparencies, wherein it is desirable to uniformly collect and detect light which may emanate from any point on a large, usually planar surface, such as the transparency. In the case of photographic transparency analysis, the transparency is normally scanned in a TV raster format with a small spot of light from a flying spot scanner. The resulting light transmitted by the transparency is then collected and detected to develop a video signal whose instantaneous amplitude is proportional to the transmissivity of successively scanned elemental areas of the transparency. If the transparency is of any considerable size, such as 5, 10 or even 20 inches in length, it is very difficult to design a practical light collection and detection system which is uniformly responsive to the light transmitted by each elemental area of the transparency, regardless of whether the element is at the center or at one of the corners of the transparency. The conventional approach is to utilize a large collection lens to focus light transmitted by the transparency onto a single light detector, such as a photomultiplier. A system of this type has inherent limitations and disadvantages resulting from its size, such as the necessarily high cost of such a large lens and the nonuniform light characteristics of such a lens-light detector combination. It would, therefore, be highly desirable to have for use in systems such as that just described, a relatively simple and inexpensive light collection and detection arrangement which exhibits a substantially uniform response characteristic over the entire transparency area, regardless of the size of that area.

It is therefore an object of the present invention to provide new and improved light collection and detection apparatus which is not only exhibits a substantially uniform response characteristic for light emanating from any point on a planar source, but also is of relatively simple and inexpensive construction.

It is a further object of the present invention to provide new and improved light collection and detection apparatus which utilizes an array of individual light detection devices to synthesize a single light detection device having a uniform response characteristic for light emanating from any point on a planar source.

It is still another object of the invention to provide new and improved light collection and detection apparatus which utilizes novel light-reflecting structures to minimize the number of light detection devices necessary in such an array and to render even more uniform the light response characteristic of the array.

In accordance with the present invention there is provided light collection and detection apparatus which exhibits a substantially uniform response characteristic with respect to an intensity-modulated diffuse spot of light which may emanate from any point on a planar source which comprises a plurality of light detection means, each having a known polar light response characteristic which is nonuniform with respect to at least some of the possible points from which the intensity-modulated diffuse spot of light may emanate on the source, each of the detection means for developing an output signal representative of the intensity of the diffuse spot of light, the plurality of detection means being arranged in a predetermined array to effect an overlapping of the individual light response characteristics by a selected amount in the plane of the source. The apparatus further comprises means for combining the output signals of the light detection means to develop a resultant output signal whose amplitude is substantially linearly proportional to the intensity of the diffuse spot of light regardless of the location of the point on the source from which the spot of light emanates.

For a better understanding of the present invention together with other and further objects thereof, reference is had to the following description taken in connection with the accompanying drawings and its scope will be pointed out in the appended claims.

DESCRIPTION OF THE APPARATUS

Figure 2:
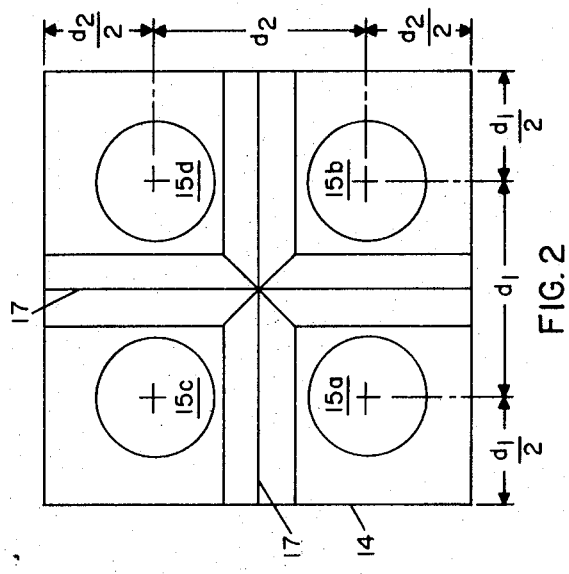
FIG. 2 is a top plan view of a portion of the light collection and detection apparatus of FIG. 1.
Figure 1:
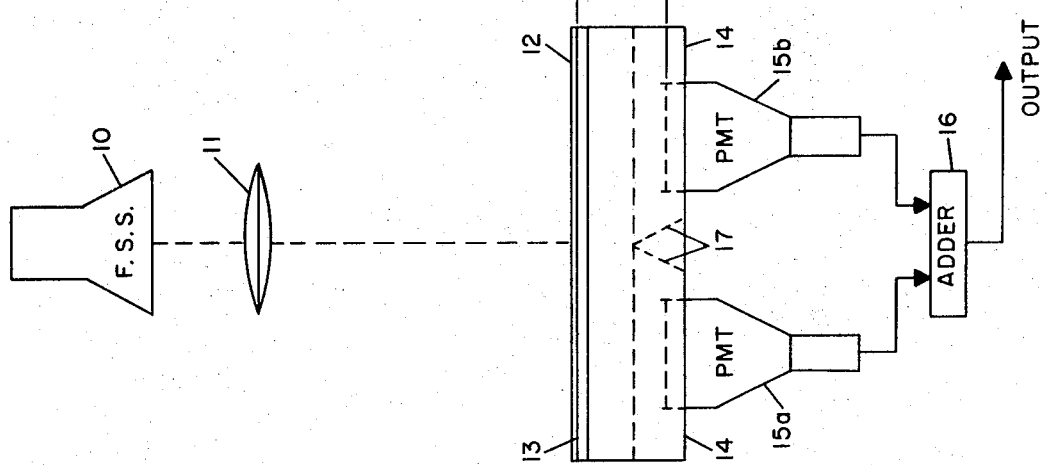
FIG. 1 is a side view of light collection and detection apparatus constructed in accordance with one embodiment of the present invention.

In FIGS. 1 and 2 of the drawings, there is shown in side and top plan views, respectively, one embodiment of light collection and detection apparatus constructed in accordance with the present invention. In describing the apparatus of FIGS. 1 and 2, it is assumed that by means of a flying spot scanner 10 and an imaging lens 11, a photographic transparency 12, located in the image plane of lens 11, is scanned with a spot of light (typically 4 mils in diameter) in a point-by-point, line-by-line fashion that is well known in the art. In accordance with one embodiment of the invention, a glass plate 13 having a translucent white, opal surface is placed under the transparency 12 with the opal surface adjacent thereto, such that at any instant of time during the scanning process, light from scanner 10 that is transmitted through transparency 12 is diffused by the opal surface of glass plate 13 and appears as an intensity-modulated diffuse spot of light which may emanate from any point in the plane of the opal glass surface. Glass plate 13 comprises planar light-diffusing means, located adjacent and substantially parallel to the plane of transparency 12, for diffusing the light which is transmitted by the transparency to provide an intensity-modulated diffuse spot of light which may emanate from any point on the planar source represented by the glass plate.

Located below plate 13 in FIG. 1 is that portion of the light collection and detection apparatus shown in plan view in FIG. 2, which consists of an array of four photomultipliers 15a, 15b, 15c and 15d, surrounded by a four-sided, bottomless, boxlike light reflecting structure 14 whose interior surfaces are highly reflective, and whose walls are substantially perpendicular to the plane of glass plate 13. Structure 14 can be made from micropolished aluminum, for example, which has a surface reflectivity of approximately 75 percent. In the present embodiment the array of photomultipliers 15a–15d, arranged in two rows and two columns, comprises a plurality of light detection means, each having a known polar light response characteristic which is nonuniform with respect to at least some of the possible points from which the diffuse spot of light may emanate on the opal surface of glass plate 13. Each of the light detection means develops an output signal whose amplitude is representative of the intensity of the diffuse spot of light. The detection means are arranged in a predetermined array in a plane substantially parallel to that of the glass plate 13 and separated therefrom by a chosen distance, thereby to effect an overlapping of the individual light response characteristic of the light detection means by a selected amount in the plane of the opal glass. Furthermore, in the present embodiment light reflective structure 14 comprises one form of light-reflecting means, arranged adjacent to at least some of the light detection means in the array, for forming mirror images of at least some of the light detection means, thereby increasing the apparent number of light detection means in the array whose individual polar light response characteristics overlap in the plane of the opal surface of glass plate 13.

Figure 6:
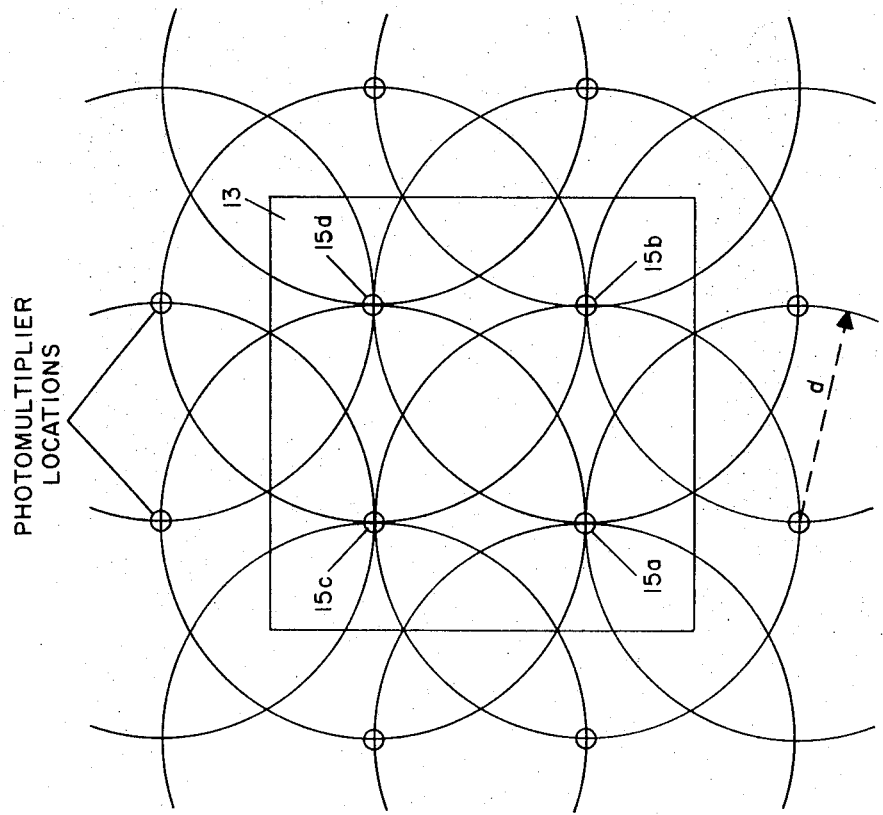

While in the embodiment of FIG. 1, the light-reflecting structure 14 is not a necessity, its use significantly simplifies the apparatus, thereby reducing its size and cost. If a light-reflecting means similar to structure 14 is not utilized, it is then necessary to increase the number of actual photomultipliers in the array by adding at least one additional photomultiplier at each end of each row and each column of existing photomultipliers, as shown in FIG. 6, thereby requiring a total of at least 12 photomultipliers to perform substantially the same function achieved in the embodiment of FIG. 1 with only four photomultipliers and the light-reflecting structure 14. Since structure 14 creates only an approximation of a larger array of photomultipliers, and since the reflective material used to fabricate the boxlike structure is not a perfect reflector, it will be recognized that a higher degree of light response uniformity can be achieved by using an actual larger array of photomultipliers. Thus, in its broadest sense, the present invention disclosed an array of light-detecting means, such as photomultipliers, utilized in a novel manner to achieve a desired response to a scanning, diffuse spot of light of variable intensity occurring with a defined planar area. Moreover, in accordance with another aspect of the invention, a novel technique is disclosed by which the number of light detectors in such an array can be reduced by the use of novel and inexpensive light-reflecting structures. Not only does this latter aspect of the invention provide an effective means for reducing the actual size and complexity of such an array, but also the resulting smaller array still exhibits a substantially uniform light response characteristic.

The apparatus of FIGS. 1 and 2 further includes means for combining the individual output signals of the photomultipliers 15a–15d to develop a resultant output signal whose amplitude is substantially linearly proportional to the intensity of the diffuse spot of light from the opal surface of glass plate 13, regardless of the location of the point on the opal surface from which the diffuse spot of light emanates. In the embodiment of FIGS. 1 and 2, this combining means is shown as a simple adder 16, which linearly adds the individual output signals developed by the four photomultipliers to develop a single resultant output signal. In its simplest form, adder 16 may be a common conductor which is jointly connected to the outputs of all four photomultipliers.

It should be noted that the light collection and detection apparatus of FIGS. 1 and 2 is particularly unique in that it does not employ any lens or lens systems whatsoever, but relies solely on the novel and unconventional use of simple light detectors such a photomultipliers, arranged in a selected array and responsive to a scanning, diffuse spot of light. The number, spacing and arrangement of photomultipliers used in a particular embodiment are dependent on the size of the area covered by the planar source from which it is desired to collect and detect the scanning diffuse light, as will be described in detail hereinafter. While in the particular embodiment of FIGS. 1 and 2 four photomultipliers are shown, this number is not intended to limit in any way the number of photomultipliers which may be used in accordance with the present invention to achieve a desired degree of uniformity in the light response characteristic.

CONSTRUCTION AND OPERATION OF THE APPARATUS

Figure 4:
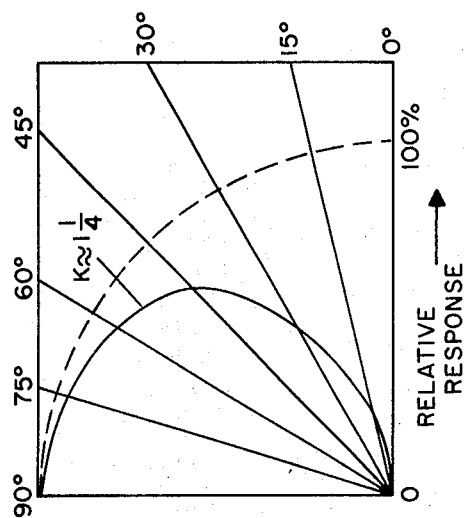
FIG. 4 is a plot of the polar response characteristic for a typical flat-faced photomultiplier, such as is used in the embodiment of FIG. 1.

In constructing light collection and detection apparatus in accordance with the present invention, it is first necessary to choose the type of photodetector to be used, and to ascertain the polar light response characteristic for that type detector. However, since photodetectors are conventionally used in such a manner that the light to be detected is focused on the face of the detector, and in this mode of use its polar light response characteristic is irrelevant, this response characteristic normally is not specified by the manufacturer. Thus, it may be necessary to empirically determine the polar light response characteristic of the photodetector chosen for use in apparatus of the present invention. If photomultipliers are chosen as the type of light detectors to be used, it has been determined that presently available photomultipliers which are of the flat-faced type, exhibit the same general form of polar light response characteristic. One quadrant of this characteristic is shown in FIG. 4 of the drawings, and if revolved through 360° about the vertical axis, it will provide the overall polar light response characteristic for typical flat-faced-type photomultipliers.

Having determined the polar light response characteristic of the type of photodetector to be used, it is then possible to proceed with a determination of the parameters of an array of such photodetectors which will provide the desired uniform response characteristics for light emanating from any point on the planar source represented by the opal surface of glass plate 13 in the apparatus of FIG. 1, for example.

A suitable array may consist of a plurality of photomultipliers arranged in a pattern of perpendicular rows and columns, with the spacing between photomultipliers in any row and any column being the same, and being such that the polar light response characteristics of the individual photomultipliers overlap one another to a desired degree in the plane of the light source (i.e.: the plane of the opal glass of plate 13). The center-to-center spacing of photomultipliers in the array is related to the shape of the polar light response characteristic of an individual photomultiplier and also to the distance between the plane of the opal glass and the plane of the photomultiplier array. It has been determined that this relationship is similar to that which is utilized in the field of illumination engineering to determine the parameters necessary for an array of lighting fixtures which will provide substantially uniform illumination of a planar surface which is parallel to the fixture array. (See "Light, Photometry, and Illuminating Engineering" by W.E. Barrows, pp. 222 et seq., McGraw-Hill (1951).) This relationship is given as:

$$K = d/h$$

where:

[$K$] is a factor determined by the shape of the polar light response characteristic of an individual photomultiplier (similar to the polar illumination characteristic of an individual lighting fixture);

[$d$] is the center-to-center spacing of the photomultipliers in the array (similar to the center-to-center spacing of lighting fixtures in the illumination array); and

[$h$] is the distance between the planar light source, represented by the opal glass of plate 13, and the photomultiplier array (similar to the distance between the surface to be illuminated and the array of lighting fixtures).

In the field of illumination engineering, the above relationship has been reduced to a set of curves which show the polar illumination characteristics necessary to give uniform illumination of a planar surface at different values of $K$, the most common values being $K=\frac{1}{2}, =\frac{3}{4}, 1, 1\frac{1}{4}$ and $1\frac{1}{2}$ and 2 (see "Standard Relations of Light Distribution" by A.J. Sweet, I. E. S., Vol. 4, pg. 745 at pg.755, 1909). ). By comparing the characteristic of FIG. 4 with the various curves of this set, it has been determined that this polar light response characteristic for a typical flat-faced photomultiplier corresponds substantially to the illumination characteristic curve given for a $K$ of $1\frac{1}{4}$. With the factor $K$ thus determined for typical flat-faced photomultipliers, the proportionality between ($d$) and ($h$) is fixed, and these parameters may be readily determined by specifying one and solving for the other. For example, in the present case where a $K$ of $1\frac{1}{4}$ has been shown to be applicable, it is possible to specify a convenient distance ($h$) between the plane of the photomultiplier array and the opal surface of glass plate 13, and thereafter solve for the corresponding center-to-center spacing ($d$) of the photomultipliers, or alternatively one can specify a convenient center-to-center spacing ($d$) and solve for the corresponding distance ($h$).

Figure 3:
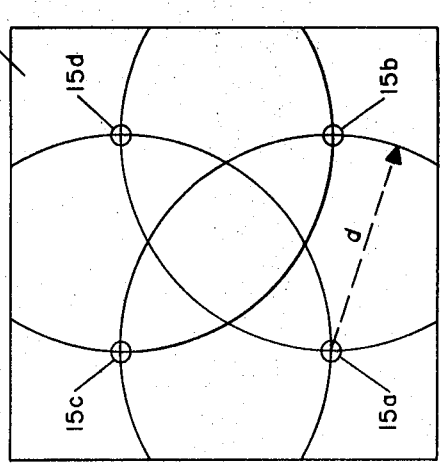
FIGS. 3, 6 and 7 are plots of overlapping photomultiplier response characteristics useful in describing the construction and operation of the apparatus of FIGS. 1 and 2.

The remaining parameter to be determined is the number of photomultipliers necessary in the array. In the simplest case, where an array of photomultipliers is used without any light reflecting structures, this number is determined by superimposing an array of photomultipliers spaced ($d$) units center-to-center onto the planar source (in this case glass plate 13) from which light is to be collected and detected. A circle of radius ($d$) is then drawn about the center of each photomultiplier, intersecting the centers of adjacent photomultipliers as shown in FIG. 3. The array of photomultipliers is then increased in number and/or its position relative to the planar source shifted until every point on the planar source is covered by at least two of the overlapping circles as shown in FIG. 6, which circles represent overlapping of the polar light response characteristics of the individual photomultipliers. The number of photomultipliers required to provide this selected amount of overlap (i.e.: 12 in the FIG. 6 array) then is the least number necessary in a simple array whose overall light response characteristic will be substantially uniform with respect to a diffuse spot of light emanating from any point on the planar source (i.e.: the opal surface of glass plate 13).

Figure 7:
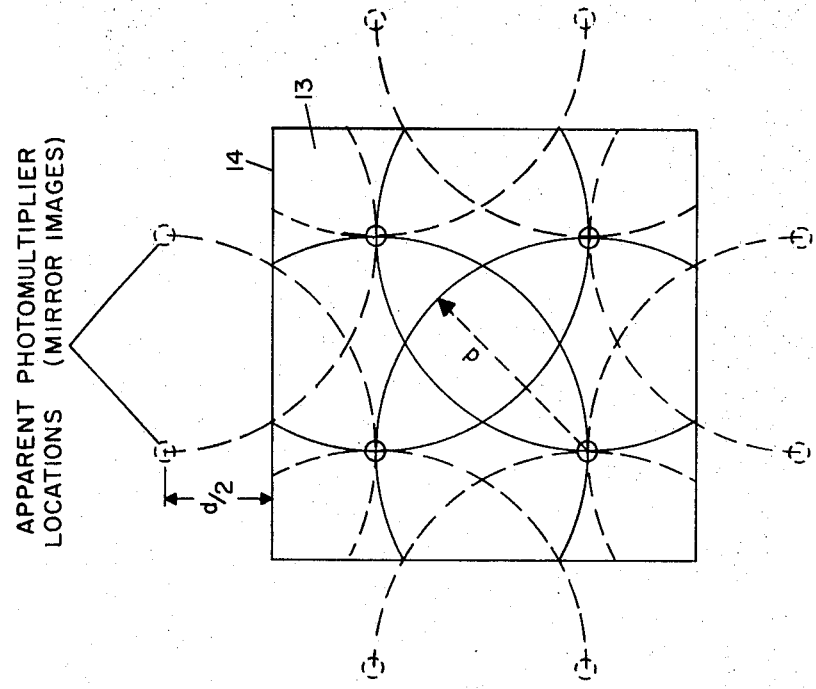

As described previously, in accordance with another aspect of the invention, novel light-reflecting structures can be employed in light collection and detection apparatus such as that just discussed in order to reduce the number of photomultipliers required to provide a given degree of uniform light responsiveness and to modify the existing light response characteristic so as to make it even more uniform. The simplest light reflecting structure is that shown in FIG. 1 as the four-sided box 14 having the same outside dimensions as the glass plate 13. The interior surfaces of box 14 have a reflectivity of 75 percent, which has been found to be sufficient to give satisfactory results. This reflectivity can be readily achieved with a simple, light weight box constructed of micropolished aluminum. Within box 14 the photomultiplier array is positioned such that the center-to-center spacing of the photomultipliers is ($d$) and the perpendicular distance between the centers of the photomultipliers and the adjacent interior surfaces of box 14 is $d/2$, as shown in FIG. 2. With this arrangement, the reflecting walls of box 14 serve to create mirror images of the actual photomultipliers in the array, with the mirror images appearing at the same center-to-center spacing ($d$) as is the case in the actual array. These images appear to be located outside of the light-reflecting box 14, as shown in FIG. 7, and therefore operate to extend the apparent size of the array, without increasing its actual size. This can be seen by comparing FIGS. 6 and 7. In FIG. 7 the amount of overlap attributable to the light response characteristics of the actual photomultipliers (shown as the solid arcs) and the light response characteristics of the mirror image photomultipliers (shown as the dotted arcs) is substantially the same as that of FIG. 6 where the larger number of actual photomultipliers is used. Thus, by utilizing simple light reflecting structures in accordance with the invention, any given size array of photomultipliers can be made to function in a manner equivalent to that of a larger array. In this manner the cost of additional photomultipliers can be saved by introducing a simple light-reflecting structure such as box 14 shown in FIGS. 1 and 2.

In the embodiment of FIGS. 1 and 2 the uniformity of its light response is established in an initial setup procedure, during which time no transparency is placed on glass plate 13 and the normal deflection circuitry of scanner 10 is disabled. Adjustable DC voltages are supplied instead to the deflection coils of scanner 10 so that the position of its light beam on the glass plate 13 can be manually controlled. The resulting diffuse spot of light is then positioned directly over one of the photomultipliers 15a–15d and bias voltages on that photomultiplier, which control its gain, are adjusted until the desired maximum amplitude of output signal is obtained. Likewise, the spot of light is successively positioned over each of the remaining three photomultipliers and their respective gains adjusted until each develops the aforementioned desired maximum amplitude output signal when the spot is directly over it. With the setup procedure thus completed the normal deflection circuitry for the flying spot scanner is reactivated and the apparatus will, thereafter function as described above, exhibiting at the output of adder 16 the desired uniformity in its response to the diffuse spot of light emanating from any point on the opal surface of glass plate 13.

In accordance with still another aspect of the invention, a second type of light-reflecting structure can be introduced within the array in order to increase its overall uniformity by increasing the apparent number of photomultipliers in the array. This second type of light-reflecting structure is shown in FIGS. 1 and 2 as being the wedge-shaped units 17 located, in this case, midway between each pair of photomultipliers, and can be constructed of the same highly reflective material as box 14. If the sides of each wedge-shaped unit 17 are set at an angle of 45°, to the vertical, for example, each unit will create mirror images of the pair of actual photomultipliers located on each side of the unit and adjacent thereto, with these images appearing between the pair of photomultipliers. Altering the slope of the sides of the wedge-shaped unit will correspondingly alter the apparent position of the mirror images. This permits adjustment of the position of the polar light response characteristics of the mirror image photomultipliers, thereby varying the amount by which these latter characteristics overlap the light response characteristics of the actual photomultipliers in the array.

Figure 5:
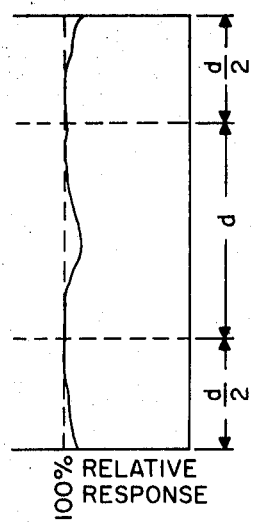
FIG. 5 is a plot of the composite response characteristic achieved by the light collection and detection apparatus of FIG. 1.

It has been found that the overall light response characteristics for the array of photomultipliers shown in FIGS. 1 and 2 with the boxlike light-reflecting structure 14, but without the wedge-shaped light-reflecting structures 17, is of the form shown in FIG. 5 of the drawings. While light collection and detection apparatus having an overall light response characteristic such as this is useful in many applications, nevertheless it can be seen that this characteristic does exhibit a slight valley at its center, and a small amount of falloff at its ends. Yet, in accordance with the further aspect of the invention this characteristic can be rendered even more uniform by simply introducing the wedge-shaped light reflectors 17, shown in FIGS. 1 and 2. The effect of adding these reflectors is to raise the central valley in the response characteristic of FIG. 5 by creating photomultiplier mirror images near the location of this valley. The characteristic of FIG. 5 can be made even more uniform by increasing slightly the separation ($d$) of the actual photomultipliers, while at the same time retaining the wedge-shaped light reflectors 17. Increasing the separation between photomultipliers serves to raise the ends of the light response characteristic of FIG. 5 by placing both the actual photomultipliers and the mirror images thereof, created by the walls of box 14, nearer to the edges of the glass plate 13, from which light is being collected and detected. While this increase in separation of the photomultipliers will also increase the depth of the central valley in the characteristic of FIG. 5, nevertheless, this valley can be raised sufficiently by means of the wedge-shaped reflectors 17 so as to achieve an overall light response characteristic which exhibits substantial uniformity over its entire length.

The aforementioned technique of increasing the separation of the photomultipliers can also be used to accommodate light sources which are rectangular-shaped instead of square-shaped as is the configuration shown in FIGS. 1 and 2. If for example the side-to-side width of the glass plate 13 in FIG. 1 were greater than its front-to-back depth, this could easily be accommodated while still using the four photomultiplier array of FIGS. 1 and 2 by simply increasing the center-to-center spacing ($d_1$) of the photomultiplier pairs 15a–15b and the pair 15c–15d. In this case, the center-to-center spacing ($d_1$) in FIG. 2 would be greater than and not equal to the center-to-center spacing ($d_2$). By using the wedge-shaped light reflectors 17 the deeper valley which would otherwise be created by this separation in the light response characteristic of FIG. 5 can be raised sufficiently to create an overall substantially uniform light response characteristic.

While there have been described what are at present considered to be the preferred embodiments of this invention, it will be obvious to those skilled in the art that various changes and modificatons may be made therein without departing from the invention and it is, therefore, aimed to cover all such changes and modifications as fall within the true spirit and scope of the invention.

What is claimed is:

1. Light collection and detection apparatus which exhibits a substantially uniform response characteristic with respect to an intensity-modulated diffuse spot of light which may emanate from any point on a planar source, comprising:

a plurality of light detection means, each having a known polar light response characteristic which is nonuniform with respect to at least some of the possible points from which said intensity-modulated diffuse spot of light may emanate on said source, each of said detection means for developing an output signal representative of the intensity of said diffuse spot of light, said plurality of detection means being arranged in a predetermined array to effect an overlapping of said individual light response characteristics by a selected amount in the plane of said source;

and means for combining the output signals of said light detection means to develop a resultant output signal whose amplitude is substantially linearly proportional to the intensity of said diffuse spot of light regardless of the location of the point on said source from which said spot of light emanates.

2. Apparatus constructed in accordance with claim 1 wherein said light detection means are arranged in said predetermined array in a plane substantially parallel to that of said source ans separated therefrom by a chosen distance, thereby to effect said selected amount of overlapping of said light response characteristics.

3. Apparatus constructed in accordance with claim 1 wherein each of said light detection means is a photomultiplier and wherein said means for combining the output signals of said photomultipliers is a conductor connected to the output of each photomultiplier.

4. Apparatus constructed in accordance with claim 1 wherein said apparatus additionally includes light-reflecting means, arranged adjacent to at least some of the light-detection means in said array, for forming mirror images of at least some of said light detection means, thereby increasing the apparent number of light detection means in said array whose individual polar light response characteristics overlap in the plane of said source.

5. Apparatus constructed in accordance with claim 4 wherein said light-reflecting means is a boxlike structure, having walls substantially perpendicular to the plane of said source and surrounding said array of light detection means, the interior surfaces of said structure being light-reflective to form said mirror images.

6. Apparatus constructed in accordance with claim 4 wherein said light-reflecting means comprises at least one wedge-shaped light-reflecting structure located within said array and between at least a pair of said light detection means for forming mirror images of said pair of light detection means, the exterior surfaces of said wedge-shaped structure being light reflective to form said mirror images.

7. Apparatus constructed in accordance with claim 1 wherein said apparatus additionally includes a boxlike light-reflecting structure, having walls substantially perpendicular to the plane of said source and surrounding said array of light detection means, for forming mirror images of at least some of said light detection means, thereby increasing the apparent number of light detection means whose individual polar light response characteristics overlap in the plane of said source, the interior surfaces of said boxlike structure being light-reflective to form said mirror images;

and at least one wedge-shaped light reflecting structure located within said array and between at least a pair of said light detection means for forming mirror images of said pair of light detection means, thereby further increasing the apparent number of light detection means whose individual polar light response characteristics overlap in the plane of said source, the exterior surfaces of said wedge-shaped structure being light reflective to form said mirror images.

8. Light collection and detection apparatus which exhibits a substantially uniform response characteristic with respect to a diffuse spot of light which may emanate from any point on a planar source, comprising:

a plurality of photomultipliers, each having a known polar light response characteristic which is nonuniform with respect to at least some of the possible points from which said diffuse spot of light may emanate on said source, each of said photomultipliers for developing an output signal representative of the intensity of said diffuse spot of light, said photomultipliers being arranged in a predetermined array in a plane substantially parallel to that of said source and separated therefrom by a chosen distance to effect an overlapping of said individual light response characteristics by a selected amount in the plane of said source;

light-reflecting means, arranged adjacent to at least some of said photomultipliers, for forming mirror images of at least some of said photomultipliers, thereby increasing the apparent number of photomultipliers in said array whose individual polar light response characteristics overlap in the plane of said source;

and means for additively combining the output signals of said photomultipliers to develop a resultant output signal whose amplitude is substantially linearly proportional to the intensity of said diffuse spot of light, regardless of the location of the point on said source from which said diffuse spot of light emanates.

9. Apparatus constructed in accordance with claim 8 wherein said light-reflecting means is a boxlike structure, having walls substantially perpendicular to the plane of said source and surrounding said array of light detection means, the interior surfaces of said structure being light-reflective to form said mirror images.

10. Apparatus constructed in accordance with claim 8 wherein said light-reflecting means comprises at least one wedge-shaped light-reflecting structure located within said array and between at least a pair of said light detection means for forming mirror images of said pair of light detection means, the exterior surfaces of said wedge-shaped structure being light-reflective to form said mirror images.

11. Light collection and detection apparatus, useful in conjunction with an electro-optical system which scans an image plane with a spot of light such that the spot may occur at any point in said image plane, comprising:

planar light-diffusing means located adjacent and substantially parallel to said image plane, for diffusing the spot of light occurring in said image plane to provide a diffuse spot of light which may emanate from any point on a planar source represented by said diffusing means;

a plurality of light detection means, each having a known polar light response characteristic which is nonuniform with respect to at least some of the possible points from which said diffuse spot of light may emanate on said diffusing means, each of said detection means for developing an output signal representative of the intensity of said diffuse spot of light, said detection means being arranged in a predetermined array to effect an overlapping of said individual light response characteristics by a selected amount in the plane of said diffusing means;

and means for combining the output signals of said light detection means to develop a resultant output signal whose amplitude is substantially linearly proportional to the intensity of said diffuse spot of light regardless of the location of the point on said diffusing means from which said spot of diffuse light emanates.

12. Light collection and detection apparatus constructed in accordance with claim 11 wherein said planar light-diffusing means comprises a thin glass plate having a translucent, white, opal surface, with said opal surface located adjacent said image plane.

13. Apparatus constructed in accordance with claim 11 wherein said light detection means are arranged in said predetermined array in a plane substantially parallel to that of said source and separated therefrom by a chosen distance, thereby to effect said selected amount of overlapping of said light response characteristics.

14. Apparatus constructed in accordance with claim 11 wherein said apparatus additionally includes light-reflecting means, arranged adjacent to at least some of the light detection means in said array, for forming mirror images of at least some of said light detection means, thereby increasing the apparent number of light-detection means in said array whose individual polar light response characteristics overlap in the plane of said source.

15. Apparatus constructed in accordance with claim 14 wherein said light-reflecting means is a boxlike structure, having walls substantially perpendicular to the plane of said source and surrounding said array of light detection means, the interior surfaces of said structure being light reflective to form said mirror images.

16 Apparatus constructed in accordance with claim 14 wherein said light-reflecting means comprises at least one wedge-shaped light-reflecting structure located within said array and between at least a pair of said light detection means for forming mirror images of said pair of light detection means, the exterior surfaces of said wedge-shaped structure being light-reflective to form said mirror images.

17. Apparatus constructed in accordance with claim 11 wherein said apparatus additionally includes a boxlike light-reflecting structure, having walls substantially perpendicular to the plane of said source and surrounding said array of light detection means, for forming mirror images at least some of said light detection means, thereby increasing the apparent number of light detection means whose individual polar light response characteristics overlap in the plane of said source, the interior surfaces of said boxlike structure being light-reflective to form said mirror images;

and at least one wedge-shaped light-reflecting structure located within said array and between at least a pair of said light detection means for forming mirror images of said pair of light detection means, thereby further increasing the apparent number of light detection means whose individual polar light response characteristics overlap in the plane of said source, the exterior surfaces of said wedge-shaped structure being light-reflective to form said mirror images.

18. Light collection and detection apparatus, useful in conjunction with an electro-optical system which scans an image plane with a spot of light such that the spot may occur at any point in said plane, comprising:

a thin, substantially flat plate of glass having a translucent, white, opal surface located adjacent said image plane, for diffusing the spot of light occuring in said image plane to provide a diffuse spot of light which may emanate from any point on the planar source represented by the opal surface of said glass plate;

a plurality of photomultipliers, each having a known polar light response characteristic which is nonuniform with respect to at least some of the possible points from which said diffuse spot of light may emanate on said opal surface, each of said photomultipliers for developing an output signal representative of the intensity of said diffuse spot of light, said photomultipliers being arranged in a predetermined array in a plane substantially parallel to that of said opal surface and separated therefrom by a chosen distance, to effect an overlapping of said individual light response characteristics by a selected amount in the plane of said opal surface;

light-reflecting means, arranged adjacent to at least some of said photomultipliers, for forming mirror images of at least some of said photomultipliers, thereby increasing the apparent number of photomultipliers in said array whose individual polar light response characteristics overlap in the plane of said opal surface;

and means for additively combining the output signals of said photomultipliers to develop a resultant output signal whose amplitude is substantially linearly proportional to the intensity of said diffuse spot of light, regardless of the location of the point on said opal surface from which said spot of diffuse light emanates.

19. Apparatus constructed in accordance with claim 18 wherein said light-reflecting means is a boxlike structure, having walls substantially perpendicular to the plane of said source and surrounding said array of light detection means, the interior surfaces of said structure being light-reflective to form said mirror images.

20. Apparatus constructed in accordance with claim 18 wherein said light-reflecting means comprises at least one wedge-shaped light-reflecting structure located within said array and between at least a pair of said light detection means for forming mirror images of said pair of light detection means, the exterior surfaces of said wedge-shaped structure being light-reflective to form said mirror images.

* * * * *